Patented Feb. 18, 1936

2,031,443

UNITED STATES PATENT OFFICE 2,031,443

METHOD OF PRODUCING CREAMERY PRODUCTS

Herman D. Wendt, West Chester, Pa., assignor to Milk Processes, Inc., Philadelphia, Pa., a corporation of Pennsylvania No Drawing. Application September 24, 1934, Serial No. 745,367

5 Claims. (Cl. 99—11)

The present invention pertains to a process of manipulating and producing creamery products by the centrifugal separation of the major portion of the liquid vehicle from an ordinary milk or cream to produce a super cream containing from 65 to 85% butter fat content, cooling of such super cream to produce a plastic product and the subsequent dilution of the plastic product so produced with liquid vehicle and, if desired, with other ingredients to obtain a creamery product containing a larger proportion of liquid vehicle than the super cream forming an intermediate stage in its process of manufacture. The process is particularly applicable to the manufacture of ice cream, and was conceived in connection with problems encountered in the manufacture of ice cream by a process involving the formation of the ice cream mix by mixing a super cream of higher than 65% butter fat content with the liquids and solids which are to comprise the ingredients of the ice cream.

The general nature of the process to which the invention pertains is disclosed in my prior patent Reissue No. 19,123 and the present invention constitutes an improvement in the details of the operation described in that patent. In that patent, I have described the manufacture of a plastic super cream of over 65% butter fat content and the dilution of that cream with liquid and other ingredients to produce an ice cream mix. While important advantages from the standpoint of facility of operation and handling of creamery products are obtained in connection with the production of ice cream by a process of this character, a certain amount of difficulty has been encountered in connection with the process of mixing down the plastic super cream with other ingredients in the formation of the mix. The principal difficulty so encountered has been a tendency upon the part of a portion of the butter fat particles of the super cream to coalesce into clusters and to be separated from the main body of the ice cream mix in the form of butter oil incident to the subsequent mixing down and heating operations. A certain degree of agitation is necessary to effect the mixing of the plastic super cream with a liquid vehicle and when such agitation is applied to cream at or near its critical churning temperature, i. e., at a temperature in the neighborhood of 50° F., the butter fat particles of the super cream tend to coalesce into small clusters of such particles in the form of butter. When this mass is subsequently heated for the purpose of pasteurizing it and effecting thorough incorporation of the various ingredients constituting the ice cream mix, the butter fat particles of the portion of the cream which has been converted into butter tend to oil off before homogenization of the ice cream mix and this oiling off results in increasing the time required to whip the mix in the freezer to effect the necessary incorporation of air incident to the freezing operation. While the tendency toward butter formation occurs in connection with the agitation of cream of any concentration in the neghborhood of its churning temperature, such tendency is especially marked in connection with the agitation of the cream used in the practice of the present invention because of its exceptionally high butter fat content. In view of this fact, even a mild degree of agitation of this super cream at a temperature approximating its churning temperature results in the formation of some butter and accordingly entails difficulty in connection with the subsequent ice cream making operation described above.

In the practice of the present invention these difficulties are avoided by carefully maintaining the super cream at a temperature substantially below 50° F. during the entire operation of mixing it down with liquid by agitation until the diluted product contains sufficient liquid to reduce its butter-fat content to 40% or less. After the cream has been diluted to this or greater extent, it may be heated to a moderate degree below the melting point of the butter-fat and agitated to effect thorough mixing with the other ingredients which may be present, in the liquid vehicle. By carefully maintaining the temperature of the cream at a sufficiently low temperature, e. g. 40° F. during the dilution thereof until its butter-fat content is below the critical degree of dilution, I am able to materially shorten the period of time required in connection with the subsequent freezing of the ice cream mix and to improve upon the quality of the ice cream produced by the process.

While the invention has been described with particular reference to the production of ice cream, it will be understood that the mixing down operation of the invention is applicable to the production of other products which may be produced by the dilution of a plastic super cream with liquid. Thus, the principle of maintaining the cream at a temperature substantially below the churning temperature during the mixing operation until the desired degree of dilution is reached is applicable to the production of various creamery products in which it is desired to maintain the creamery product in the condition of a true cream, i. e., in a condition in which the butter-fat particles exist in the dispersed phase in the liquid vehicle. While particular emphasis has been laid upon the feature of avoiding a temperature in the general neighborhood of 50° F. incident to the mixing operation, I wish to point out that it is not only necessary to avoid temperatures within this range, but that it is also necessary to avoid temperatures substantially above 50° F. until the amount of liquid added has effected dilution of the creamery product to a butter-fat content of less than 40%. While these higher temperatures do not result in the churning of the cream to produce butter clusters, they result in the even more undesired phenomenon of the direct oiling of the butter fat particles. In the practice of the invention it is therefore desirable that the super cream be maintained at a temperature substantially below 50° F. during the entire mixing operation until concentration of the butter-fat has been reduced to 40% or less and thereafter to subject the product to further agitation at a temperature of 65–90° F.

Modifications will be obvious to those skilled in the art and I do not therefore wish to be limited except by the scope of the sub-joined claims.

I claim:

1. The method of converting plastic cream having a butter fat content of over 65% into a liquid creamery product containing butter fat in the dispersed phase which comprises adding a liquid to said plastic cream and agitating the cream in contact with said liquid while maintaining the cream and liquid at a temperature below 50° F.

2. The method of converting plastic cream having a butter fat content of over 65% into a liquid creamery product containing butter fat in the dispersed phase which comprises adding a liquid to said plastic cream and agitating the cream in contact with said liquid while maintaining the cream and liquid at a temperature of approximately 40° F.

3. The method of converting plastic cream having a butter fat content of over 65% into a liquid creamery product containing butter fat in the dispersed phase which comprises adding a liquid to said plastic cream and agitating the cream in contact with said liquid while maintaining the cream and liquid at a temperature below 50° F. and thereafter incorporating other solid and liquid ingredients with the creamery product so produced, raising the temperature to between 65 and 90° F. and agitating the materials to effect thorough homogenization thereof.

4. The method of converting plastic cream having a butter fat content of over 65% into a liquid creamery product containing butter fat in the dispersed phase which comprises adding a liquid to said plastic cream and agitating the cream in contact with said liquid while maintaining the cream and liquid at a temperature below 50° F. until a sufficient amount of liquid has been incorporated in the cream to reduce its butter fat content to less than 40% and thereafter heating the creamery product so produced to a temperature substantially in excess of 50° F. in order to effect a thorough mixing of ingredients.

5. The method of converting plastic cream having a butter fat content of over 65% into a liquid creamery product containing butter fat in the dispersed phase which comprises adding a liquid to said plastic cream and agitating the cream in contact with said liquid while maintaining the cream and liquid at a temperature below 50° F. until a sufficient amount of liquid has been incorporated in the cream to reduce its butter fat content to less than 40% and thereafter heating the creamery product so produced to a temperature between 65 and 90° F. in order to effect a thorough mixing of ingredients.

HERMAN D. WENDT.